(12) United States Patent
Brammer et al.

(10) Patent No.: US 11,486,478 B2
(45) Date of Patent: Nov. 1, 2022

(54) MULTI-SPEED ELECTRIC TRANSMISSION ASSEMBLY AND AXLE ASSEMBLY

(71) Applicant: Dana Heavy Vehicle Systems Group, LLC, Maumee, OH (US)

(72) Inventors: Andrew T. Brammer, Toledo, OH (US); Michael D. Cook, Holland, OH (US); Jordan M. Houser, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/940,110

(22) Filed: Jul. 27, 2020

(65) Prior Publication Data

US 2021/0033179 A1   Feb. 4, 2021

Related U.S. Application Data

(60) Provisional application No. 62/879,863, filed on Jul. 29, 2019.

(51) Int. Cl.
*F16H 37/08*   (2006.01)
*B60K 1/00*    (2006.01)
*F16H 3/66*    (2006.01)

(52) U.S. Cl.
CPC ............ *F16H 37/082* (2013.01); *B60K 1/00* (2013.01); *F16H 3/663* (2013.01); *B60K 2001/001* (2013.01); *B60Y 2200/92* (2013.01); *F16H 2200/0021* (2013.01); *F16H 2200/0039* (2013.01); *F16H 2200/201* (2013.01); *F16H 2200/202* (2013.01); *F16H 2200/2035* (2013.01)

(58) Field of Classification Search
CPC .... F16H 3/006; F16H 57/043; F16H 57/0473; F16H 2003/007; F16H 2200/2038; F16H 2200/2064; F16H 2200/2069
See application file for complete search history.

(56) References Cited

U.S. PATENT DOCUMENTS

| | | | |
|---|---|---|---|
| 8,795,113 B2 | 8/2014 | Grochowski et al. | |
| 10,377,221 B2 | 8/2019 | Holmes et al. | |
| 2008/0182704 A1* | 7/2008 | Thomas | F16H 3/663 475/269 |
| 2009/0275438 A1 | 11/2009 | Kersting | |
| 2014/0031161 A1 | 1/2014 | Wenthen | |
| 2015/0276022 A1* | 10/2015 | Lichtenegger | B60K 6/48 475/5 |
| 2016/0263984 A1* | 9/2016 | Kasuya | B60K 6/383 |
| 2018/0051778 A1* | 2/2018 | Kato | F16H 37/04 |
| 2019/0100092 A1 | 4/2019 | Schilder et al. | |
| 2019/0344660 A1 | 11/2019 | Kumar et al. | |

FOREIGN PATENT DOCUMENTS

| | | |
|---|---|---|
| CN | 109835183 A | 6/2019 |
| WO | 2017089087 A1 | 6/2017 |

* cited by examiner

*Primary Examiner* — Colby M Hansen
(74) *Attorney, Agent, or Firm* — McCoy Russell LLP

(57) ABSTRACT

Methods and systems are provided for an electric axle assembly. In one example, a system includes an electric axle assembly configured to receive an output of a ring gear, wherein a differential of the electric axle assembly distributes the output to wheels of a vehicle.

19 Claims, 2 Drawing Sheets

MULTI-SPEED ELECTRIC TRANSMISSION ASSEMBLY AND AXLE ASSEMBLY

CROSS-REFERENCE TO RELATED APPLICATION

The present application claims priority to U.S. Provisional Application No. 62/879,863, entitled "MULTI-SPEED ELECTRIC TRANSMISSION ASSEMBLY AND THE AXLE ASSEMBLY MADE THEREWITH", and filed on Jul. 29, 2019. The entire contents of the above-listed application are hereby incorporated by reference for all purposes.

TECHNICAL FIELD

The present description relates generally to a multi-speed electric transmission assembly.

BACKGROUND AND SUMMARY

Hybrid powertrains for vehicles utilize different power sources under different operating conditions. The different power sources may include an internal combustion engine and one or more motor-generators. The different operating conditions may be selected by engaging brakes and/or clutches to utilize a single power source or a combination of power sources. While the various operating modes may improve fuel economy and/or a vehicle power output, the configuration of the hybrid powertrain may be complex and increase packaging requirements.

One example approach comprising a hybrid vehicle drivetrain is shown in U.S. Pat. No. 10,377,221 by Holmes et al. Therein, a powertrain includes a drive unit that is modular, including a first planetary gear having a sun gear, a ring gear, and a carrier member rotatable along an axis. A first brake is configured to selectively engage the ring gear and a first clutch is operatively connected to the ring gear.

However, the inventors have found some issues with the approach described by Holmes. In one example, the configuration illustrated in Holmes demands shafts to be inserted through other shafts to connect a carrier gear to a sun gear across different planetary gears of the powertrain. This may result in manufacturing inefficiencies and increased packaging constraints.

In one example, the issues described above may be addressed by a multi-speed electric transmission assembly, comprising an electric motor generator. The transmission assembly comprises a first shaft mechanically coupled to the first electric motor generator, wherein a first gear assembly is mechanically coupled to the first shaft. The first gear assembly comprises a first planetary gear assembly comprising a first planet gear set. A second shaft is mechanically coupled to the first gear assembly and a second gear assembly, different than the first gear assembly, wherein the second gear assembly comprises a second planet gear set and a third planet gear set, wherein a carrier is engaged with each of the first planetary gear set and the second planetary gear set, and a ring gear of the second gear assembly provides an input to an electric axle assembly. In this way, a packaging size of the transmission assembly may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a powertrain assembly for a vehicle. In one example, the powertrain assembly comprises a motor-generator, a first gear assembly, a second gear assembly, and an electric axle assembly. A ring gear of the second gear assembly outputs torque to the electric axle assembly, which may transfer the torque to one or more wheels of the vehicle. In one example, the vehicle is a hybrid vehicle comprising an internal combustion engine and an electric motor powered via an energy storage device (e.g., a battery).

In one example, by utilizing the ring gear as an output to the electric axle assembly, enhanced accessibility and compactness of the second gear assembly along with simplified assembly may be realized. In one example, the gear assembly is a Ravigneaux assembly, which enables the ability to have three gear ratios in a compact package. Other arrangements are possible but may demand more physical space in order to achieve the same three forward ratios.

It is to be understood that the present disclosure may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Figure 1:
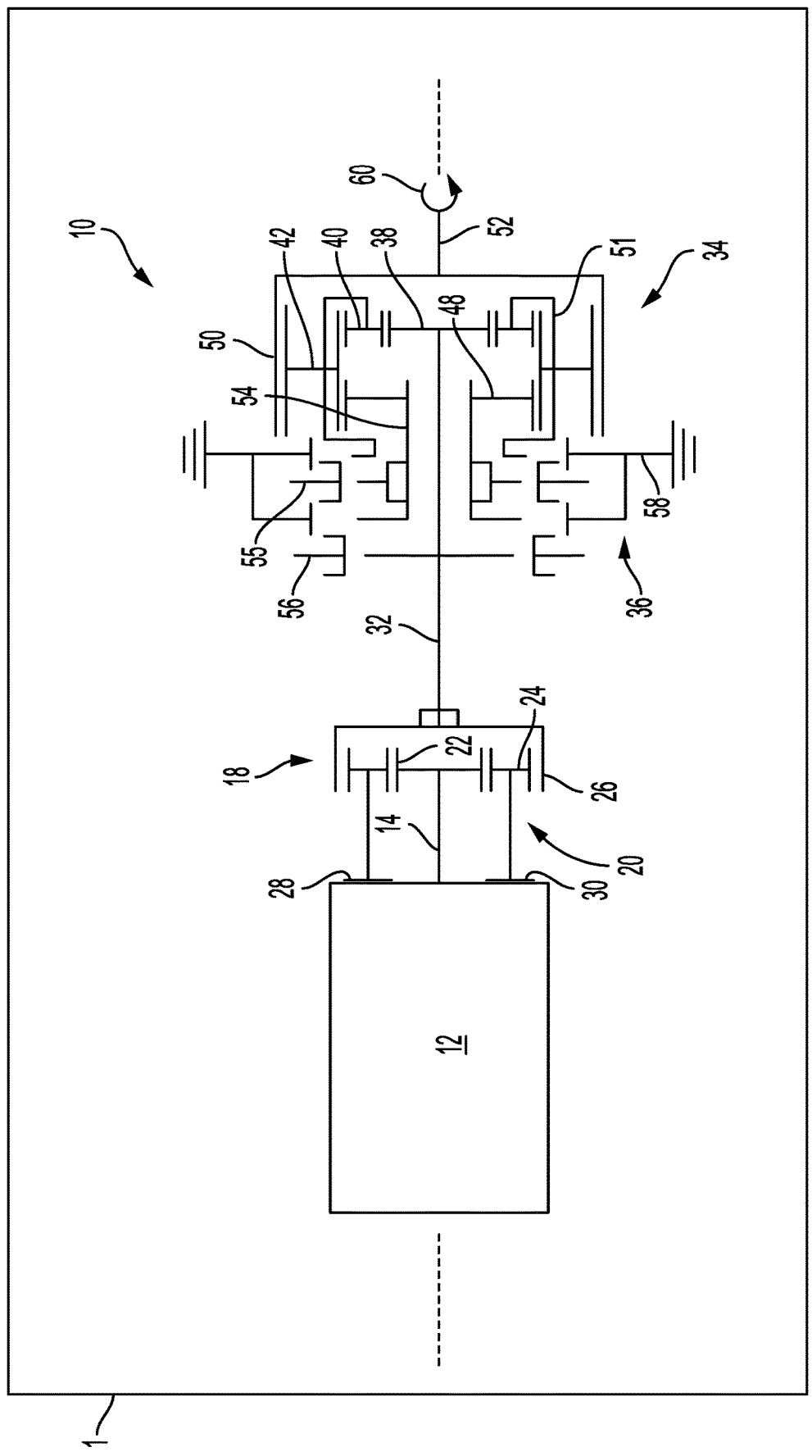
FIG. 1 shows a schematic view of an embodiment of a multi-speed electric transmission assembly.

Embodiments of a multi-speed electric transmission assembly 10 are illustrated in FIG. 1. Each embodiment may be utilized in an electric drive axle assembly. Also, each embodiment may have applications in commercial vehicles, light, medium, and heavy duty vehicles, and for passenger, off-highway, and sport utility vehicles. Additionally, each embodiment of the multi-speed electric transmission assembly 10 may be adapted for use in front and/or rear driving axles, and steerable and non-steerable axles. It would be understood by one of ordinary skill in the art that the multi-speed electric transmission assembly 10 described herein may also have industrial, locomotive, military, agricultural, and aerospace applications.

Figure 2:
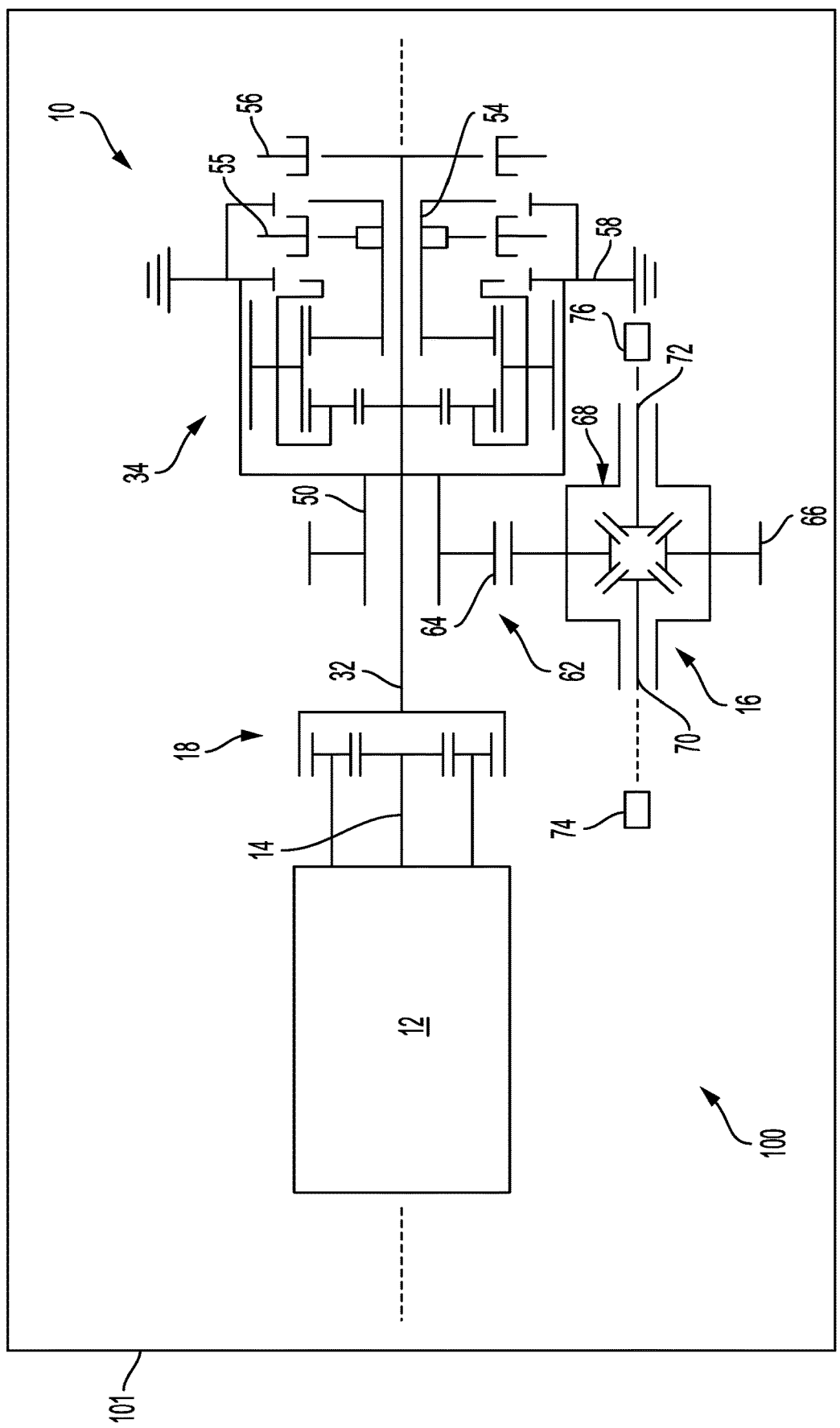
FIG. 2 shows a schematic view of an embodiment of an electric axle assembly including an embodiment of the multi-speed electric transmission assembly of FIG. 1.

Referring now to FIG. 1, the multi-speed electric transmission assembly 10 comprises a first electric motor generator 12 arranged in a vehicle 1. A first shaft 14 is operably coupled to the first electric motor-generator 12 for rotation. In some embodiments, the first shaft 14 may be operably coupled to a second electric motor generator (not depicted) for rotation. The first electric motor generator 12 and the second electric motor generator, when provided, each provide power, which can drive an axle 16, which is illustrated in FIG. 2.

The first shaft 14 has an axis of rotation. The first shaft 14 may be supported for rotation by one or more bearings (not depicted). The first shaft 14 extends into a first gear assembly 18. As illustrated in FIG. 1, the power communicated to the first gear assembly 18 from the first electric motor generator 12 may be transmitted by the first shaft 14 into only one side 20 of the first gear assembly 18.

In an embodiment, the first gear assembly 18 comprises a planetary gear assembly. Using a planetary arrangement in the first gear assembly 18 allows the transmission system's compactness to be increased in relation to non-planetary arrangements. In this embodiment, the first gear assembly 18 may comprise a first sun gear 22. The first sun gear 22 is operably coupled to the first shaft 14 and rotates therewith. The first sun gear 22 is in meshed engagement with a first planet gear set 24. The first planet gear set 24 is in meshed engagement with a first ring gear 26. Each planet gear of the first planet gear set 24 is coupled to a first planet carrier 28. The first planet carrier 28 is coupled to a stationary member 30, wherein the stationary member 30 is non-rotatable. In the embodiment illustrated in FIG. 1, the stationary member 30 is a motor housing of the first motor generator 12. Each planet gear of the first planet gear set 24 rotates with respect to the first planet carrier 28.

A second shaft 32 is operably coupled to the first ring gear 26 for rotation therewith. The second shaft 32 has an axis of rotation that is aligned with the axis of rotation of the first shaft 14. The second shaft 32 may be supported for rotation by one or more bearings (not depicted). The second shaft 32 extends into a second gear assembly 34. As illustrated in FIG. 1, the power communicated to the first gear assembly 18 from the first electric motor generator 12 is transmitted by the second shaft 32 into only one side 36 of the second gear assembly 34.

In an embodiment, the second gear assembly 34 comprises a second planetary gear assembly. In this embodiment, the second gear assembly 34 may comprise a second sun gear 38. The second sun gear 38—is operably coupled to the second shaft 32 and rotates therewith. The second sun gear 38 is in meshed engagement with a second planet gear set 40. The second planet gear set 40 is in meshed engagement with a third planet gear set 42. The third planet gear set 42 is in meshed engagement with each of the second planet gear set 40, a second sun gear 48, and a second ring gear 50. In one example, the second sun gear 38 has an outermost diameter that is smaller than an outermost diameter of the third sun gear 48. The second planet gear set 40 and the third planet gear set 42 may be coupled to a second planet carrier 51. The second planet gear set 40 and the third planet gear set 42 rotate independently of the second planet carrier 51. The second planet carrier 51 may be the only carrier in the second gear assembly, in one example. In this way, the system achieves a space efficient arrangement.

The second planet gear set 40 and the third planet gear 42 set co-rotate with a fixed gear ratio with respect to each other. In some embodiments, the second gear assembly 34 may be of the Ravigneaux variety. As known to those of ordinary skill in the art, a Ravigneaux gear set comprises differently sized sun gears along with a single planet carrier holing two sets of planetary gears. The planetary gear sets are arranged at different radial positions, each set comprising a plurality of gears. The planetary gear sets may rotate independently of the carrier while rotating with a fixed gear ratio with respect to one another. The inner planetary gear set may be coupled to (e.g., in meshed engagement) with a smaller of the sun gears and the outer planetary gear set may be coupled to a larger of the sun gears. The planetary gear sets may rotate with a fixed gear ratio with respect to the sun gear to which they are in a meshed engagement. The ring gear may couple and co-rotate with the gears of the outer planetary gear set in a fixed gear ratio with respect to the outer planetary gear set.

The second ring gear 50 is disposed around the third planet gear set 42. Inner teeth on the second ring gear 50 may engage one or more planet gears of the third planet gear set 42. The second ring gear 50 may be directly coupled to an output shaft 52. The output shaft 52 may be supported for rotation with one or more bearings (not depicted). The output shaft 52 has an axis of rotation. In some embodiments, the axis of rotation of the output shaft 52 is aligned with an axis of rotation of the second shaft 32. In other embodiments, the output shaft 52 and the second shaft 32 share an axis of rotation.

The second ring gear 50 is disposed around the third sun gear 48. The third sun gear 48 may be operably coupled to a third shaft 54. Preferably, the third shaft 54 is hollow. In some embodiments, the third shaft 54 is concentric with and disposed around a portion of the second shaft 32.

One or more clutch assemblies 55, 56 may be selectively coupled to one or more portions of the second gear assembly 34. In some embodiments, a first clutch assembly 55 may be provided. The first clutch assembly 55 may be selectively coupled to at least a portion of the second planet carrier 51 coupled to the second planet gear set 40 and the third planet gear set 42. In an embodiment, the first clutch assembly 55 is disposed proximate the third sun gear 48. When the first clutch assembly 55 is engaged with the second planet carrier 51, the second planet carrier 51 is held stationary and does not rotate. In this embodiment, the first clutch assembly 55 may be utilized to selectively couple the second planet carrier 51 to a grounded portion of a gear housing 58. The first clutch assembly 55 may comprise a first shift fork and a first actuator.

In other embodiments, a second clutch assembly 56 may be provided. In one example, the second clutch assembly 56 is disposed proximate the first clutch assembly 55. In an embodiment, the second clutch assembly 56 is disposed between the first gear assembly 18 and the first clutch assembly 55. The second clutch assembly 56 may comprise a second shift fork and a second actuator. In some embodiments, the second clutch assembly 56 may be utilized to selectively couple the third shaft 54 to a grounded portion of the gear housing 58. When the third shaft 54 is coupled to a grounded portion of the gear housing 58, the third sun gear 48 is held stationary and does not rotate. In other embodiments, the second clutch assembly 56 may be utilized to selectively couple the second shaft 32 to the third shaft 54. When the second shaft 32 is coupled to the third shaft 54, the second sun gear 38 and the third sun gear 48 are held and rotate together.

As illustrated in FIG. 1, the output shaft 52 may be coupled to a yoke 60 or another coupling member. The yoke 60 may be coupled to drive shaft transferring power to a drive axle (e.g., a differential in a drive axle). Alternatively, the output shaft 52 may be fixedly coupled to a third gear assembly 62, which is illustrated in FIG. 2. In this embodiment, the multi-speed electric transmission assembly 10 is utilized in an electric axle assembly 100.

As, shown in FIG. 2, the third gear assembly 62 comprises a first gear 64. The first gear 64 may be of the pinion variety. The first gear 64 is in meshing engagement with a second gear 66. The second gear 66 may be of the ring gear variety. The second gear 66 is operatively connected to a differential 68. The second gear 66 is drivingly connected to a first axle shaft 68 and a second axle shaft 70 by way of the differential 68.

The differential 68 may be operatively connected to the axle 16. The differential 68 is a gear train comprising one or more shafts allowing different wheel speeds. The differential 68 may comprise a plurality of gears in meshed engagement in a housing. In one example, the differential 68 may be a locking differential, a limited slip differential, or an open-type differential.

The axle 16 may comprise the first axle shaft 70 and the second axle shaft 72. Each axle shaft 70, 72 may be attached to a wheel, wherein the first axle shaft 70 is attached to a first wheel 74 and the second axle shaft 72 is attached to a second wheel 76. In certain embodiments, the differential 68 may operate at a first speed, a second speed, and a third speed. The differential 68 may operate at a first speed when the planet carrier is held stationary and does not rotate. The differential 68 may operate at a second speed when the second sun gear 48 is held stationary and does not rotate. The differential 68 may operate at a third speed when the first sun gear 38 and the second sun gear 48 are held and rotate together. Said another way, the transmission system/assembly is operated in one of the first, second, or third speed (e.g., gear ratios) and transfers power to the differential 68, thereby operating the differential 68 at the first, second, or third speed. To select a different gear ratio, a clutch may be actuated to adjust the gear ratio from a first gear ratio to the second or third gear ratio.

In this way, power may be provided by the electric motor-generator 12 to the sun gear 22 via the first shaft 14. The sun gear 12 may be in meshed engagement with one or more gears of the gear set 24. As described above, the gear set 24 is a planetary gear set, however, it will be appreciated by those of ordinary skill in the art that the gear set may comprise gears along different axes. The gear set 24 is in meshed engagement with the first ring gear 26, which outputs power to the second shaft 32. The second shaft 32 transfers power to the second sun gear 38 which may be smaller than the third sun gear 48. The second sun gear 38 transfer power to the second planetary gear set 40. The second planetary gear set 40 transfers power to the third planetary gear set 42, which is in meshed engagement with the third sun gear 48, the third sun gear 48 configured to transfer power to the ring gear 50. In the vehicle 101, the ring gear 50 outputs its power to the third gear assembly 62 of the electric axle assembly 100, which may distribute power to the wheels via the differential 68.

As illustrated in FIG. 2, the electric axle assembly 100 may be in a parallel configuration. As used herein, the phrase "parallel configuration" refers to the first electric motor generator 12 providing power that is transmitted parallel to the orientation of the axle 16. However, in other embodiments (not depicted), the axle assembly may be in a perpendicular configuration. As used herein, the phrase "perpendicular configuration" refers to the first electric motor generator 12 providing power that is transmitted perpendicular to the orientation of the axle 16.

In the embodiment illustrated in FIG. 2, the electric axle assembly 100 comprises the first electric motor generator 12 and a first stage gear reduction, which is driven by the first electric motor generator 12. As such, components previously introduced may be similarly numbered herein. Preferably, the first stage gear reduction comprises the first gear assembly 18. In some embodiments, the first gear assembly 18 comprises a first planetary gear assembly. The electric axle assembly 100 comprises a second stage gear reduction. The second stage gear reduction is driven by the first stage gear reduction. The second stage gear reduction comprises the second gear assembly 34. Preferably, the second gear assembly 34 comprises a second planetary gear assembly. Preferably, a third stage gear reduction is driven by the second stage gear reduction. The third stage gear reduction comprises the third gear assembly 62. In some embodiments, the third gear assembly 62 comprises the first gear 64 and the second gear 66. The first axle shaft 70 and the second axle shaft 72 are driven by the third stage gear reduction through the differential 68.

In the example of FIG. 2, the second ring gear 50 is arranged between the first ring gear 26 and the second sun gear 38. As such, the second ring gear 50 may be more proximal to the first gear assembly 18 than any other gear of the second gear assembly 34.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claim, which follows.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a hybrid vehicle powertrain may comprise a first gear assembly, a second gear assembly, and a third gear assembly. The first gear assembly may comprise a first planetary gear set, an output of which operates the second gear assembly. The second gear assembly may comprise a Ravigneaux configuration, wherein an output of a ring gear of the second gear assembly is used as an input of the third gear assembly. The third gear assembly comprises a differential configured to adjust a torque output to one or more wheels. In one example, the second gear assembly comprises a common carrier coupled to two separate planetary gear sets of the second gear assembly. The technical effect of using a single planet carrier is to reduce a number of shafts concentric with one another. By doing this, a packaging size of the powertrain may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric transmission assembly, comprising:
    an electric motor generator;
    a first shaft mechanically coupled to the electric motor generator;
    a first gear assembly mechanically coupled to the first shaft via a first sun gear, wherein the first gear assembly further comprises a first planetary gear assembly comprising a first gear set;
    a second shaft mechanically coupled to a first ring gear of the first gear assembly and a second sun gear of a second gear assembly, different than the first gear assembly, wherein the second gear assembly comprises a second planet gear set and a third planet gear set, wherein the second planet gear set is coupled to the second sun gear and a planet carrier, the third planet gear set is coupled to the planet carrier and a second ring gear of the second gear assembly; and
    a carrier coupled to each of the first planet gear set and the second planet gear set;
    wherein the second ring gear of the second gear assembly provides an input to a third sun gear coupled to a third shaft and to an output shaft of an electric axle assembly.

2. The multi-speed electric transmission assembly of claim 1, wherein the carrier is selectively grounded.

3. The multi-speed electric transmission assembly of claim 1, wherein the second gear assembly is a Ravigneaux gear assembly.

4. The multi-speed electric transmission of claim 1, wherein the carrier is the only carrier of the second gear assembly.

5. A system, comprising:
    an electric motor;
    a first gear assembly comprising a first shaft engaged with a first sun gear, a first planet gear set coupled to the first sun gear, a first planet carrier coupled to each of the first planet gear set and a housing of the electric motor, and a first ring gear coupled to the first planet gear;
    a second gear assembly comprises a second shaft coupled to the first ring gear and a second sun gear, a second planet gear set coupled to the second sun gear and a second planet carrier, a third planet gear set coupled to the second planet carrier and a second ring gear; and
    an electric axle assembly comprising a third gear assembly comprising a first gear and a second gear coupled to an axle, wherein a first gear of the third gear assembly is coupled to and receives an output of the second ring gear.

6. The system of claim 5, wherein a differential is included in the axle and wherein the differential is directly coupled to the second gear in the third gear assembly.

7. The system of claim 5, wherein the first shaft and the second shaft comprise a common central axis.

8. The system of claim 5, wherein a differential of the electric axle assembly is configured to distribute power to wheels.

9. The system of claim 8, wherein the second ring gear is further coupled to a yoke coupled to a driveshaft.

10. The system of claim 5, wherein the second gear assembly is arranged in a gear housing, and wherein the first gear assembly and the electric axle assembly are arranged outside of the gear housing.

11. The system of claim 5, wherein the second gear assembly comprises a third shaft concentric with the second shaft.

12. The system of claim 11, wherein the second gear assembly comprises a first clutch assembly and a second clutch assembly.

13. The system of claim 12, wherein the first clutch assembly is configured to selectively couple the second planet carrier to a grounded portion of a gear housing.

14. The system of claim 12, wherein the second clutch assembly is configured to selectively couple a third shaft to a grounded portion of a gear housing, wherein the third sun gear is held stationary in response to the third shaft being coupled to the grounded portion.

15. An electric axle system, comprising:
an electric motor;
a first gear assembly comprising a first shaft engaged with a first sun gear, a first planet gear set coupled to the first sun gear, a first planet carrier coupled to each of the first planet gear set and a housing of the electric motor, and a first ring gear coupled to the first planet gear;
a second gear assembly comprises a second shaft coupled to the first ring gear and a second sun gear, a third shaft concentric with the second shaft, a second planet gear set coupled to the second sun gear and a second planet carrier, a third planet gear set coupled to the second planet carrier and a second ring gear, wherein the second gear assembly comprises a first clutch assembly configured to selectively couple the second planet gear to a grounded portion of a gear housing and a second clutch assembly configured to selectively couple the third shaft to the grounded portion of the gear housing; and
an electric axle assembly comprising a third gear assembly comprising a first gear and a second gear arranged on a third shaft, wherein the first gear is coupled to and receives an output of the second ring gear.

16. The electric axle system of claim 15, wherein the gear housing is configured to house only the second gear assembly.

17. The electric axle system of claim 15, wherein the second ring gear is more proximal to the first gear assembly than the second sun gear.

18. The electric axle system of claim 15, wherein first, second, and third shafts are coaxial.

19. The electric axle system of claim 15, wherein the second gear assembly is the only Ravigneaux gear assembly in the electric axle system.

* * * * *